(12) United States Patent
    Igarashi

(10) Patent No.: US 9,757,809 B2
(45) Date of Patent: Sep. 12, 2017

(54) GRINDING SPINDLE FOR SCREW GRINDER

(71) Applicant: NSK LTD., Tokyo (JP)

(72) Inventor: Kiyoshi Igarashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/439,064

(22) PCT Filed: Oct. 25, 2013

(86) PCT No.: PCT/JP2013/078989
    § 371 (c)(1),
    (2) Date: Apr. 28, 2015

(87) PCT Pub. No.: WO2014/069370
    PCT Pub. Date: May 8, 2014

(65) Prior Publication Data
    US 2015/0290732 A1    Oct. 15, 2015

(30) Foreign Application Priority Data

Oct. 31, 2012  (JP) .................................. 2012-240926

(51) Int. Cl.
    *B23G 1/38*    (2006.01)
    *B24B 41/04*   (2006.01)

(52) U.S. Cl.
    CPC ................ *B23G 1/38* (2013.01); *B24B 41/04* (2013.01)

(58) Field of Classification Search
    CPC ........... B24B 41/04; B24B 47/12; B23G 1/38; B23G 1/36
    See application file for complete search history.

(56) References Cited

U.S. PATENT DOCUMENTS 4,748,872 A * 6/1988 Brown .................. B25B 21/001
                                                    81/57.26
5,020,281 A * 6/1991 Neff ...................... B23D 47/126
                                                    30/388
(Continued)

FOREIGN PATENT DOCUMENTS

CN        102240930 A    11/2011
JP        55-58919 A     5/1980
(Continued)

OTHER PUBLICATIONS

Office Action dated Jun. 23, 2015, issued by the State Intellectual Property Office of P.R. China in counterpart Chinese Application No. 201380002536.0.
(Continued)

*Primary Examiner* — Larry E Waggle, Jr.
*Assistant Examiner* — Henry Hong
(74) *Attorney, Agent, or Firm* — Sughrue Mion, PLLC

(57) ABSTRACT

A quill includes a fixing side quill to be fixed to a spindle housing and a leading end side quill having a whetstone mounted thereon and removably connectable to the fixing side quill. In the connecting portions between the fixing side quill and the leading end side quill, faces that are perpendicular to the axis of the quill are combined with each other. A first drive shaft is provided within the fixing side quill, and a second drive shaft, rotatable integrally with the whetstone, is provided within the leading end side quill. The first drive shaft and second drive shaft are removably connected to each other.

8 Claims, 11 Drawing Sheets

(56) References Cited

U.S. PATENT DOCUMENTS

| | | | | |
|---|---|---|---|---|
| 5,398,454 A * | 3/1995 | Berner | ............... | B24B 23/04 |
| | | | | 451/357 |
| 6,095,658 A * | 8/2000 | Kalousis | ............ | B25B 21/00 |
| | | | | 362/119 |
| 7,100,287 B2 * | 9/2006 | McCoid | ............ | A01D 34/90 |
| | | | | 30/276 |
| 8,834,159 B2 * | 9/2014 | Carron | ............... | A61C 1/12 |
| | | | | 433/116 |
| 2002/0177485 A1 | 11/2002 | Cermak et al. | | |
| 2006/0073778 A1 * | 4/2006 | Phillips | ............ | B24B 7/184 |
| | | | | 451/354 |
| 2009/0042657 A1 | 2/2009 | Schneider et al. | | |

FOREIGN PATENT DOCUMENTS

| | | |
|---|---|---|
| JP | S 61-99406 U | 6/1986 |
| JP | 200052148 A | 2/2000 |
| JP | 2000-74046 A | 3/2000 |
| JP | 2003-28184 A | 1/2003 |
| JP | 2005-22058 A | 1/2005 |
| JP | 2009-542997 A | 12/2009 |

OTHER PUBLICATIONS

Int. Search Report and Written Opinion dated Feb. 4, 2014 issued in Int. Application No. PCT/JP2013/078989 (PCT/ISA/210 & PCT/ISA/237).
Office Action dated May 10, 2016, issued by the Japanese Intellectual Property Office in counterpart Japanese Application No. 2012-240926.

* cited by examiner

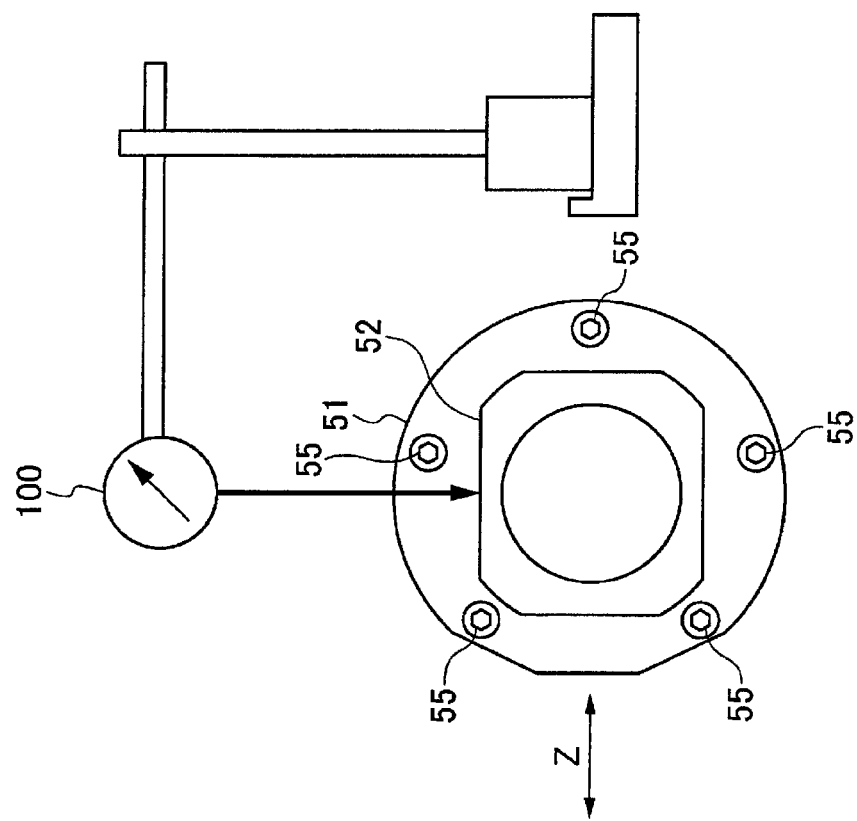

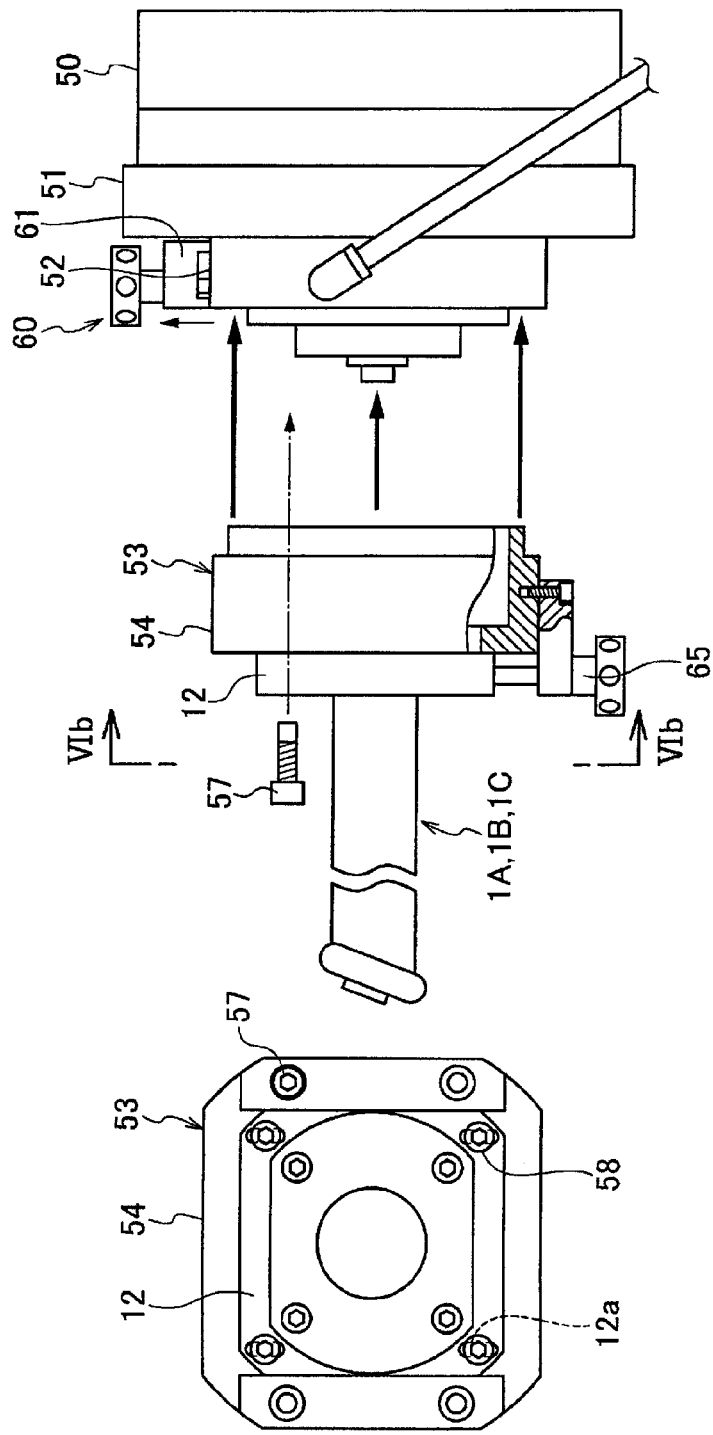

GRINDING SPINDLE FOR SCREW GRINDER

TECHNICAL FIELD

The invention relates to a grinding spindle for a screw grinder for grinding a screw groove in the inner peripheral surface of a work and, especially, a grinding spindle in which the rotation axis of a whetstone disposed in the leading end of a quill can be inclined relative to the axis of the quill according to the lead angle of a screw groove to be formed in the inner peripheral surface of the work.

BACKGROUND ART

In a screw grinder for grinding a screw groove with the rotation axis of a whetstone inclined relative to a main spindle, the rotation axis of the whetstone is inclined relative to the main spindle by an angle equal to the lead angle of a screw groove (for example, the screw groove of a ball nut) and the whetstone having the same shape as the section shape of the screw groove is moved along the screw groove to thereby work the screw groove in an accurate shape.

In this case, instead of inclining the grinding spindle or a spindle housing supporting it, as shown in FIG. 11, the rotation axis S of a whetstone 203 is inclined according to the lead angle α of a screw groove 302 to be formed in the cylindrical inner peripheral surface 301 of a work 300 to thereby keep the axis of a quill 201 mounted in a spindle housing 250 parallel to the axis of the main spindle.

Conventionally, for example, in a spindle apparatus disclosed in the patent document 1, a flexible shaft (wire) serving as a drive shaft is disposed within an integrally structured quill and a whetstone is connected to the leading end of the flexible shaft, whereby the whetstone can be rotated around a rotation axis inclined relative to the axis of the quill.

Also, in a grinding spindle disclosed in the patent document 2, a flexible shaft is used as a drive shaft and the inclination of the leading end side of the quill can be adjusted along an arc-shaped guide rail relative to the axis of the quill.

RELATED ART REFERENCE

Patent Document

Patent Document 1: JP-A-2000-74046
Patent Document 2: JP-A-S55-58919

SUMMARY OF THE INVENTION

Problems to be Solved by the Invention

In the patent document 1, the quill has an integrated structure and thus the rigidity of the quill can be enhanced. However, whenever the lead angle of the screw groove of the work differs, the whole quill must be replaced with respect to the spindle housing and, in this replacement, it is troublesome to align and position the quill in the peripheral direction with respect to the spindle housing (phase adjusting operation).

In the patent document 2, the angle of the leading end side of the quill can be changed and adjusted manually. This raises a possibility that the accurate inclination angle of the whetstone cannot be provided and the rigidity of the angle adjusting part can be lowered.

The invention aims at solving the above problems. Thus, its object is to provide a grinding spindle for a screw grinder which can change the inclination of a whetstone according to the lead angle accurately and easily and also can enhance the rigidity of a quill.

Means for Solving the Problems

The above object of the invention can be attained by the following structures.

(1) A grinding spindle for use in a screw grinder, includes:
a quill to be mounted on a spindle housing;
a whetstone provided on the leading end of the quill; and
a flexible drive shaft provided within the quill for driving the whetstone, with the rotation axis of the whetstone being inclined relative to the axis of the quill according to the lead angle of a screw groove to be formed in the inner peripheral surface of a work to be mounted on a spindle disposed opposed to the spindle housing, wherein:
the quill includes a fixing side quill to be fixed to the spindle housing and a leading end side quill having the whetstone mounted thereon and removably connectable to the fixing side quill;
in the connecting portions between the fixing side quill and the leading end side quill, the end face of the fixing side quill perpendicular to the axis of the quill and the end face of the leading end side quill are combined with each other;
the drive shaft includes a first drive shaft provided within the fixing side quill and a second drive shaft provided within the leading end side quill and rotatable integrally with the whetstone; and
the first and second drive shafts are removably connected to each other.

(2) In the grinding spindle according to the above (1),
the first drive shaft and the second drive shaft are removably connected to each other through a rotary joint rotatably provided in the fixing side quill, and
the connecting end portion of the first drive shaft and the connecting end portion of the second drive shaft respectively to be connected to the rotary joint respectively have a polygonal section shape capable of sliding in the axial direction relative to the rotary joint and also of rotating integrally with the rotary joint.

(3) In the grinding spindle according to the above (1) or (2), the connecting portions include a spigot fitting portion for centering the leading end side quill with respect to the fixing side quill and phase adjusting means for phase adjusting the leading end side quill with respect to the fixing side quill.

(4) The grinding spindle according to any one of the above (1) to (3), further includes a phase adjusting mechanism for phase adjusting the fixing side quill with respect to the spindle housing.

(5) The grinding spindle according to the above (4), further includes:
a fixing bracket to be fixed to the spindle housing so as to be parallel thereto; and
a removable bracket removably mounted on the fixing bracket for supporting the fixing side quill, wherein:
the fixing side quill is fixed to the spindle housing through the removable bracket and the fixing bracket by fastening the removable bracket to the fixing bracket; and
the phase adjusting mechanism includes a paralleling plate mounted on the fixing bracket and contactable with the side surface of the fixing bracket and the side surface of the removable bracket such that the side surface of the fixing bracket and the side surface of the removable bracket are parallel to each other.

(6) The grinding spindle according to any one of the above (1) to (5), further includes a height adjusting mechanism for adjusting the position of the fixing side quill in a direction perpendicular to the axis of the quill.

(7) In the grinding spindle according to the above (6), wherein:

the removable bracket is structured to support the fixing side quill such that the fixing side quill can be adjusted finely in a direction perpendicular to the axis of the quill; and the height adjusting mechanism is mounted on the removable bracket and moves the fixing side quill in a direction perpendicular to the axis of the quill to thereby adjust the position of the fixing side quill.

Advantages of the Invention

According to the grinding spindle of the invention, the quill having the whetstone in its leading end and fixable to the spindle housing is divided to a fixing side quill to be fixed to the spindle housing and a leading end side quill having the whetstone, while they are then removably connected to each other. Thus, by previously preparing multiple leading end side quills with their whetstones having different inclination angles, the leading end side quill can be replaced according to the lead angle of the screw groove of a work. That is, in the case that the position relationship of the connecting portions between the fixing side quill and leading end side quill is previously determined in the design producing stage, simply by previously positioning the fixing side quill in the early stage for fixing the fixing side quill to the spindle housing, the positioning operation when replacing the leading end side quill can be reduced and the inclination angle of the whetstone corresponding to the lead angle of a screw groove to be worked can be realized with no troublesome adjustment.

Also, in the connecting portions between the fixing side quill and leading end side quill, the end face of the fixing side quill and the end face of the leading end side quill respectively perpendicular to the axis of the quill are combined with each other, whereby the whetstone can be inclined at an angle accurately corresponding to the lead angle. Further, although the quill is divided to the fixing side quill and leading end side quill, since the quill connecting portions have no angle adjusting mechanism, the rigidity of the quill can be enhanced sufficiently.

BRIEF DESCRIPTION OF THE DRAWINGS

FIG. 4A is a side view and FIG. 4B is a view taken along the IV-IV arrow shown in FIG. 4A.

FIG. 5 explains a step to be executed after the step of FIGS. 4A and 4B. It is a front view, showing a state where a fixing bracket is being positioned (phase adjusted) in the peripheral direction thereof.

FIGS. 6A and 6B explain a step to be executed after the step of FIG. 5, showing a state where the grinding spindle is being mounted onto the fixing bracket. FIG. 6A is a side view and FIG. 6B is a view taken along the VI-VI arrow shown in FIG. 6A.

FIG. 7A is a side view and FIG. 7B is a view taken along the VII-VII arrow shown in FIG. 7A.

FIG. 8A is a side view and FIG. 8B is a view taken along the VIII-VIII arrow shown in FIG. 8A.

MODES FOR CARRYING OUT THE INVENTION

Description is given below of an embodiment of the invention with reference to the drawings.

Figure 1:
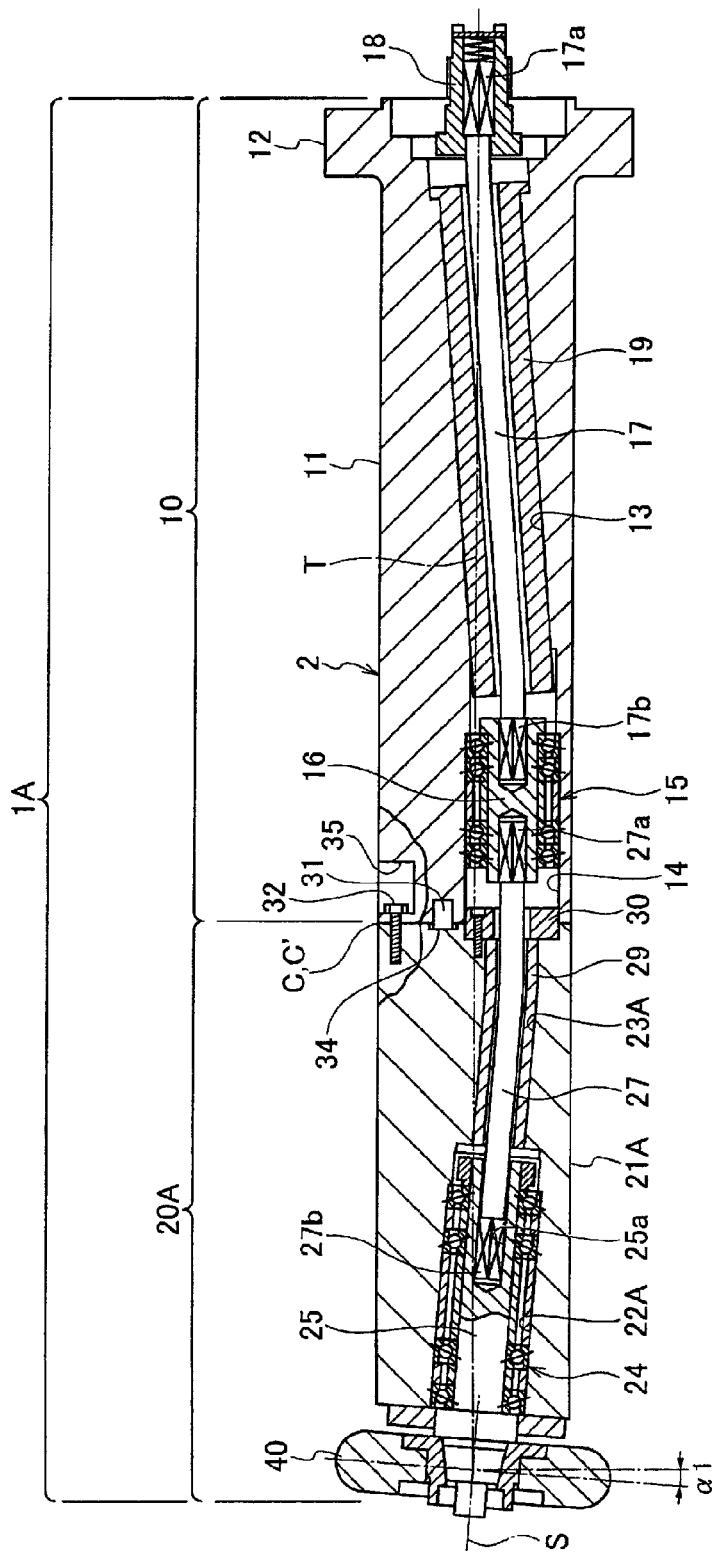
FIG. 1 is a section view of a grinding spindle for a screw grinder according to an embodiment of the invention.
Figure 9:
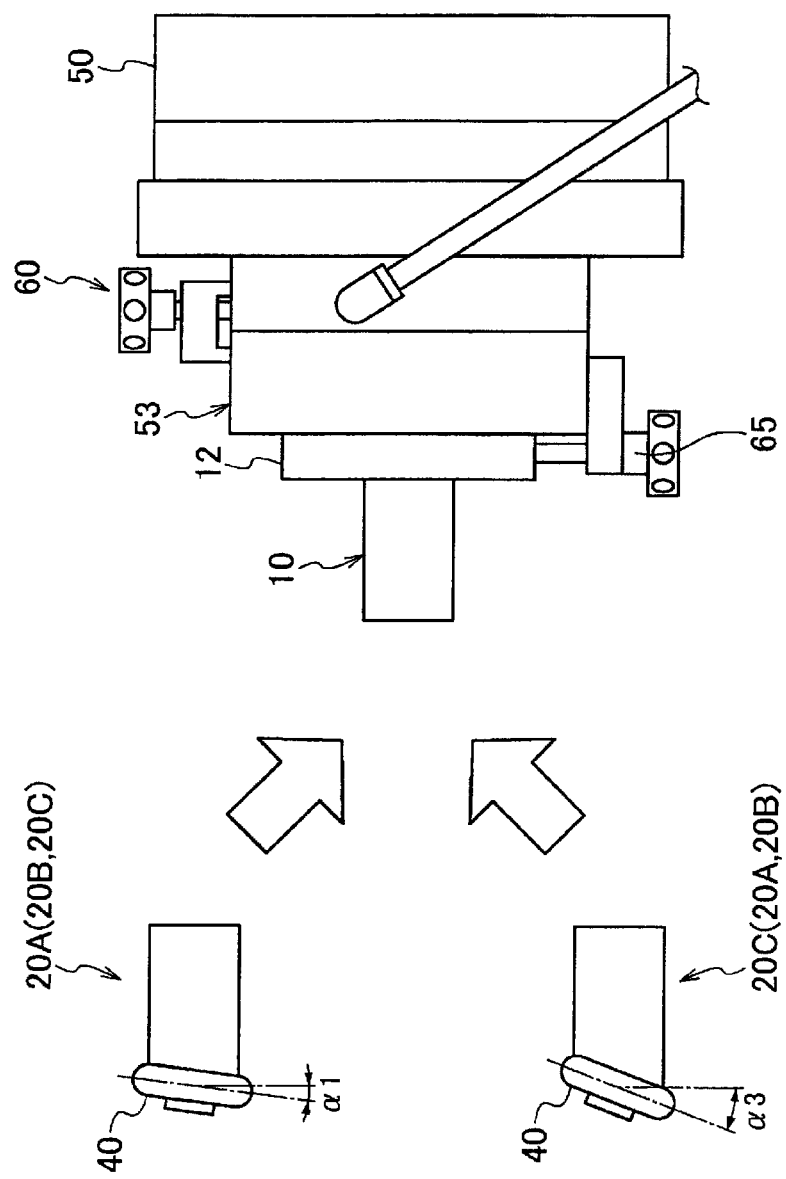
FIG. 9 is a side view to show that the leading end side of the grinding spindle can be replaced.

FIG. 1 is a section view of a grinding spindle 1A for a screw grinder according to the embodiment. The grinding spindle 1A is divided in its axial direction to a fixing side unit 10 to be mounted onto a spindle housing 50 (see FIG. 9) and a replaceable leading end side unit 20A removably connected to the leading end of the fixing side unit 10, while the leading end side unit 20A is connected to the fixed side unit 10 for common use to thereby constitute the grinding spindle 1A.

That is, a quill 2, which has a major axis extending along the vertical direction and has an elliptical section shape, is divided in the axial-direction middle portion of the quill 2 to a fixing side quill 11 and a leading end side quill 21A. The connecting portion between the fixing side quill 11 and leading end side quill 21A includes flat surfaces C, C' perpendicular to the axis T of the quill 2 (an axis coincident with the extension of the center axis of the spindle housing 50), while these surfaces are combined with each other. The flat surfaces C, C' have been worked precisely.

Although not shown, the spindle housing 50 is supported on a whetstone base such that it is opposed to a main spindle for supporting a work, while the axis of the spindle housing 50 and the axis of the main spindle are set to be parallel to each other.

The fixing side unit 10 mainly includes the fixing side quill 11 having on its base end side a flange 12 for connection to the spindle housing 50 (see FIGS. 6A and 6B) and a flexible first drive shaft 17 rotatably supported through a bearing unit 15 within the quill 11. The axial-direction middle portion of the first drive shaft 17 is stored through a cylindrical guide member 19 within a penetration hole 13 inclined relative to the axis of the fixing side quill 11 (coincident with the axis of the quill 2).

The fixed side quill 11 has, in its leading end portion, a shaft support hole 14 communicating with the penetration hole 13. This shaft support hole 14 is formed parallel to the axis of the fixing side quill 11, the bearing unit 15 is engaged with the inner periphery of the shaft support hole 14, and a rotary joint 16 is supported by the bearing unit 15 such that its axis extends parallel to the axis T of the quill 11 and can be rotated. To one end side of the rotary joint 16, there is connected the leading end side connecting end portion 17b of the first drive shaft 17. The connecting end portion 17b has a polygonal section shape and is engaged with the rotary joint 16 such that it is slidable in the axial direction and can be rotated integrally therewith. The base end portion 17a of the first drive shaft 17 also has a polygonal section shape and can be connected through a coupling 18 to a drive shaft (not shown) within the spindle housing 50 (see FIGS. 6A and 6B).

The leading end side unit 20A mainly includes the leading end side quill 21A connectable to the leading end of the fixing side quill 11, a flexible second drive shaft 27 and a whetstone shaft 25 respectively supported rotatably through a bearing unit 24 within quill 21A, and a disk-shaped whetstone 40 mounted on the leading end of the whetstone shaft 25. The whetstone shaft 25 is provided such that its rotation axis S is inclined by a specific angle relative to the axis T of the quill 2. This inclination angle is set equal to the lead angle α1 of the screw groove of a work to be worked.

Within the leading end side quill 21A, there are formed a leading end side shaft support hole 22A inclined relative to the axis T of the quill 2 and a base end side penetration hole 23A inclined similarly. The bearing unit 24 is engaged into the leading end side shaft support hole 22A and the whetstone shaft 25 is rotatably supported by the bearing unit 24. The leading end portion 27b of the polygonal section of the second drive shaft 27 is engaged into a connecting hole 25a formed in the end face of the whetstone shaft 25.

The second drive shaft 27 is stored through a cylindrical guide member 29 within the penetration hole 23A inclined relative to the axis of the leading end side quill 21A (coincident with the axis of the quill 2). The connecting end portion 27a of the polygonal section of the base end side of the second drive shaft 27 projects from the flat surface C of the base end side of the leading end side quill 21A and, when the leading end side quill 21A is connected to the fixing side quill 11, is engaged with the other end side of the rotary joint 16 supported within the fixed side quill 11. That is, the first drive shaft 17 of the fixing side unit 10 and the second drive shaft 27 of the leading end side unit 20A can be removably connected to each other through the rotary joint 16. In this case, the second drive shaft 27 of the leading end side unit 20A and the connecting end portions 17b, 27a of the first drive shaft 17 of the fixing side unit 10 are connected through the rotary joint 16 to each other slidably in the axial direction of the rotary joint 16.

A spigot-fitting portion 30 is bolt fastened to the base end portion of the leading end side quill 21A and, when the spigot-fitting portion 30 is spigot-fitted with the inner periphery of the shaft support hole 14 of the fixing side quill 11, the leading end side quill 21A can be aligned with the fixed side quill 11. In the flat surface C of the leading end side quill 21A and the flat surface C' of the fixing side quill 11, there are formed a pin 31 and an elongated hole 34 for peripheral direction positioning, that is, for phase adjustment (phase adjusting means). The elongated hole 34 is formed long in the radial direction around an axis (center axis of the shaft support hole 14) to be phase-adjusted by spigot-fitting, while it enables positioning of the pin 31 in the peripheral direction. The leading end side quill 21A and fixing side quill 11 can be connected to each other by a bolt 32 stored in the recess 35 of the outer periphery of the fixing side quill 11.

Here, although the above-mentioned grinding spindle 1A can work the screw groove of a lead angle α1, when working screw grooves of different lead angles, leading end side units 20B, 20C with their whetstones 40 having different inclination angles are mounted on the fixing side quill 11.

Figure 2:
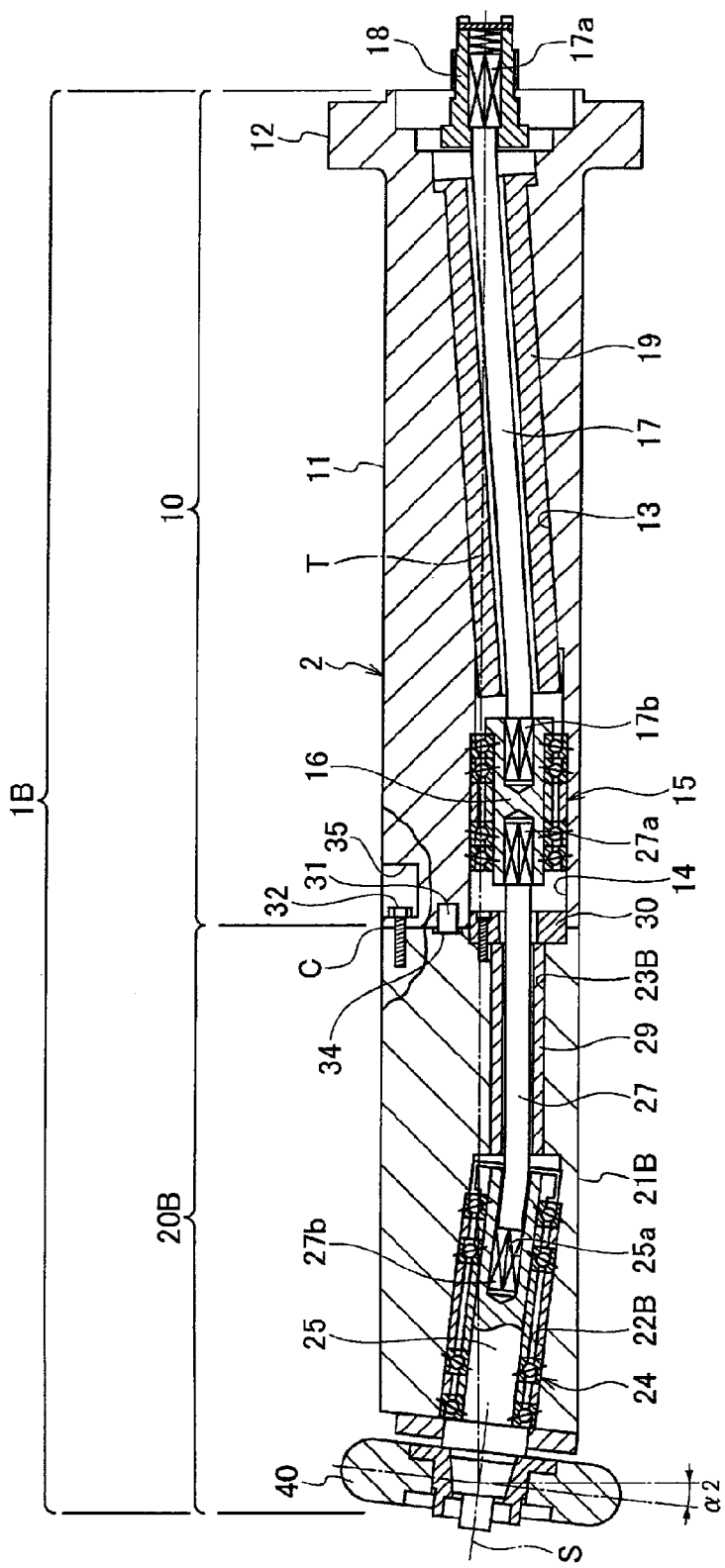
FIG. 2 is a section view of a grinding spindle for mounting thereon a leading end side unit different from that shown in FIG. 1.

That is, in the grinding spindle 1B shown in FIG. 2, the leading end side unit 20B is set such that the inclination angle of the whetstone 40 has an angle α2 different from α1. Thus, the inclination angle of the axis of the shaft support hole 22B of the leading end side quill 21B supporting the whetstone shaft 25 is set for α2 and the rotation axis S of the whetstone shaft 25 supported by the bearing unit 24 is inclined by the angle α2 relative to the axis T of the quill 2. Also, in the leading end side unit 20B, a penetration hole 23B for storing the base end side of the second drive shaft 27 is set parallel to the axis T of the quill 2. Other structures are similar to the leading end side unit 20A.

Figure 3:
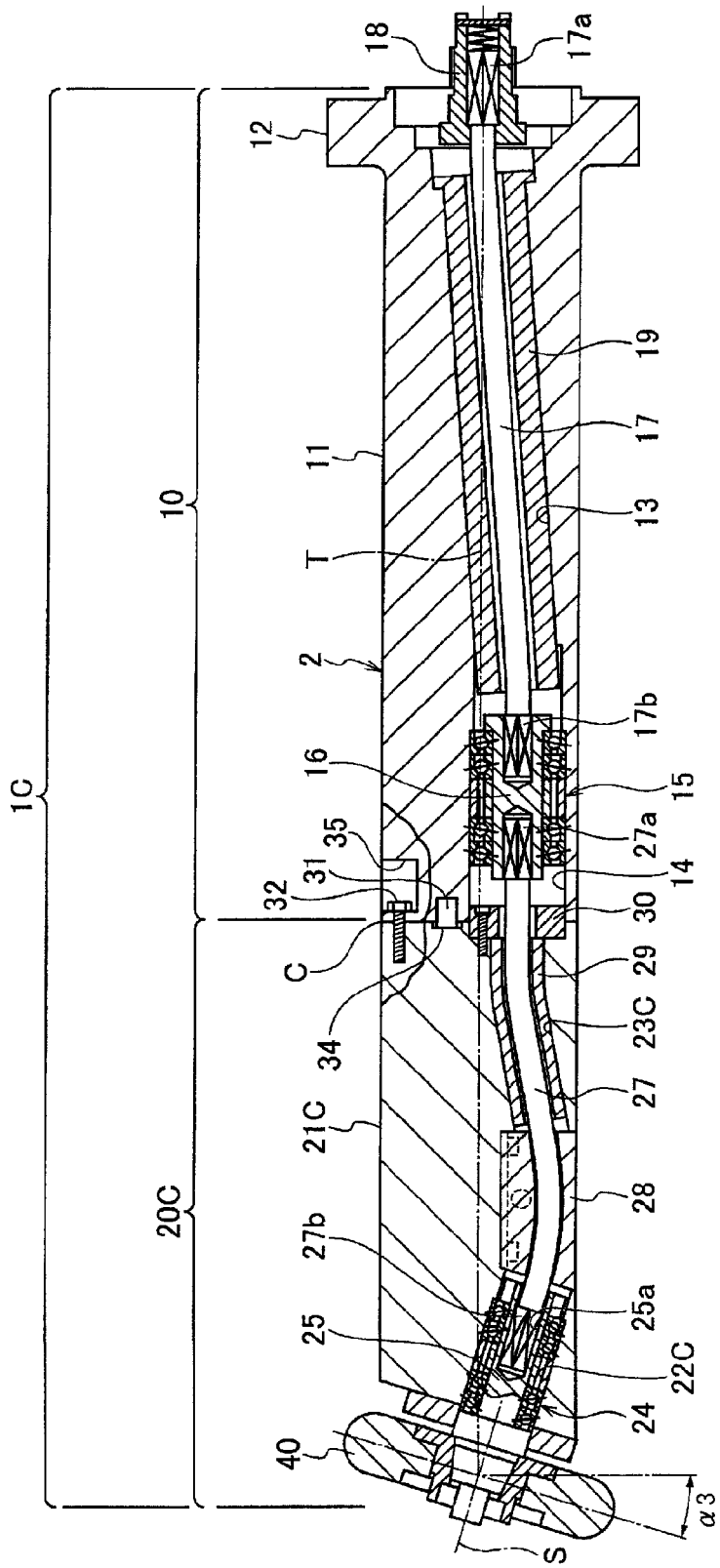
FIG. 3 is a section view of a grinding spindle for mounting thereon a leading end side unit different from those of FIGS. 1 and 2.

Also, in a grinding spindle 1C shown in FIG. 3, a leading end side unit 20C is set such that the whetstone 40 has an inclination angle α3 larger than α1. Thus, the inclination angle of the axis of the shaft support hole 22C of the leading end side quill 21C supporting the whetstone shaft 25 is set for α3 and the rotation axis S of the whetstone shaft 25 supported by the bearing unit 24 is inclined by the angle α3 relative to the axis T of the quill 2.

Also, in the leading end side unit 20C, a penetration hole 23C for storing the base end side of the second drive shaft 27 is inclined relative to the axis T of the quill 2. Further, with the relationship of the curvature of the second drive shaft 27, a portion of the leading end side quill 21C is cut out and an auxiliary guide member 28 for supporting the second drive shaft 27 is mounted in the cut-out portion. Other structures are similar to the leading end side unit 20A.

Next, referring to FIGS. 4A to 9, description is given of a step of mounting the grinding spindle 1A, 1B or 1C onto the spindle housing 50.

Figures 4A, 4B:
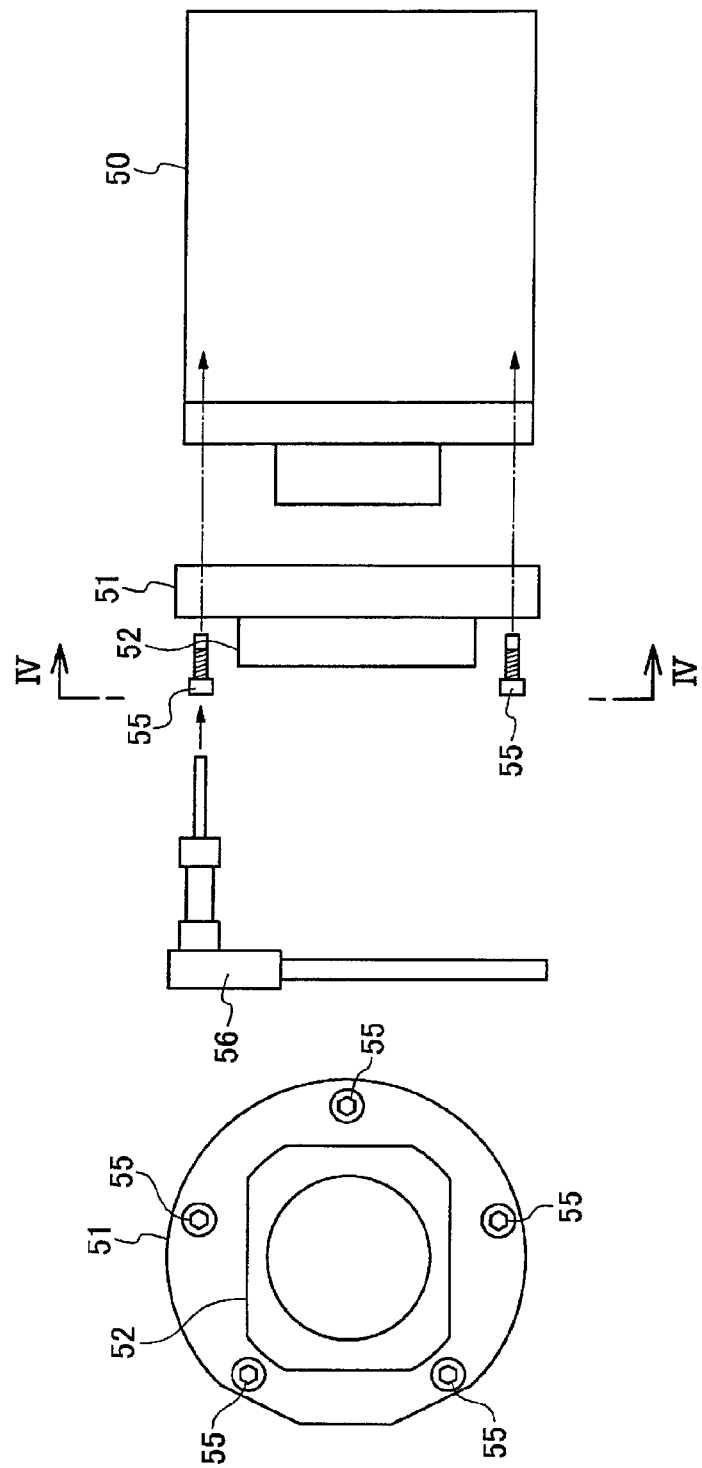
FIGS. 4A and 4B explain the procedure for mounting a grinding spindle onto a spindle housing.

To mount the grinding spindle 1A, 1B or 1C onto the spindle housing 50, firstly, as shown in FIGS. 4A and 4B, bolts 55 are fastened by a tool 56 to fix a fixing bracket 51 to the spindle housing 50. In this case, with the bolts 55 loosely fastened, as shown in FIG. 5, while the probe of a dial gauge 100 is applied to a reference surface 52 constituted of the plane of the fixing bracket 51, the spindle housing 50 is moved in the horizontal direction (the whetstone cutting direction shown by the arrow Z). In this operation, after variations in the measured values of the dial gauge 100 are adjusted to an allowable value or less, that is, after the inclination of the reference surface 52 is adjusted to an allowable value or less, the bolts 55 are fastened.

Thus, the inclination of the reference surface 52 of the fixing bracket 51 provides an allowable value or less and the fixing bracket 51 is fixed to the spindle housing 50 in a state where, substantially, it is not inclined.

Next, as shown in FIGS. 6A and 6B, in a state where a paralleling mechanism 60 serving as a phase adjusting mechanism is loosely mounted on the reference surface 52 of the fixing bracket 51, a removable bracket 53 supporting the fixing side quill 11 of the grinding spindle 1A~1C is inserted into the fixing bracket 51 and further a bolt 57 is inserted for slip-off prevention.

Figure 7A:
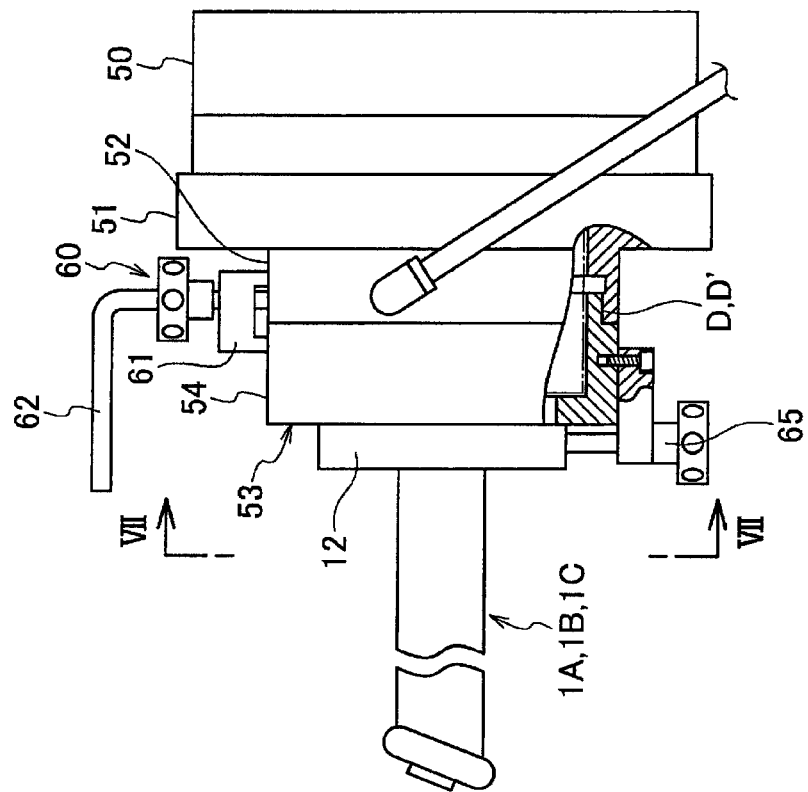
FIGS. 7A and 7B explain a step to be executed after the step of FIGS. 6A and 6B, showing a state where the grinding spindle is being phase adjusted using the reference surface of the fixing bracket.
Figure 7B:
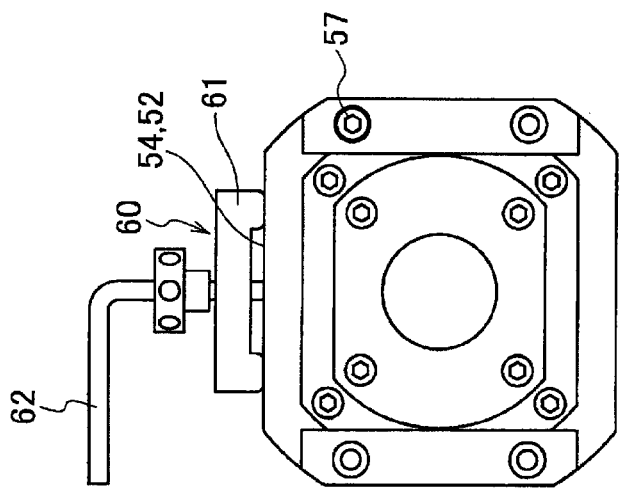
Figure 8A:
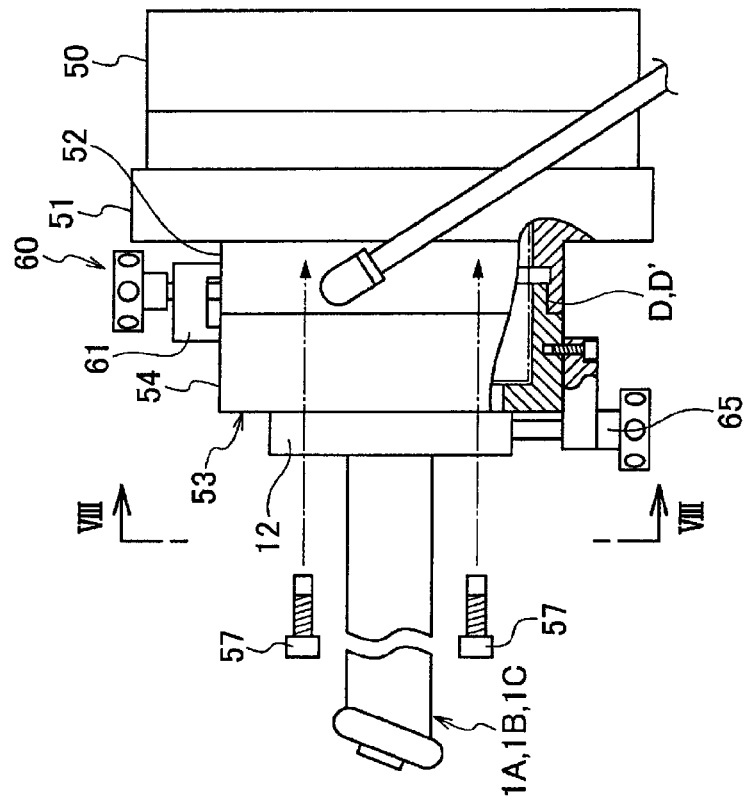
FIGS. 8A and 8B explain a step to be executed after the step of FIGS. 7A and 7B, showing a state where a removable bracket is being fastened to the fixing bracket.
Figure 8B:
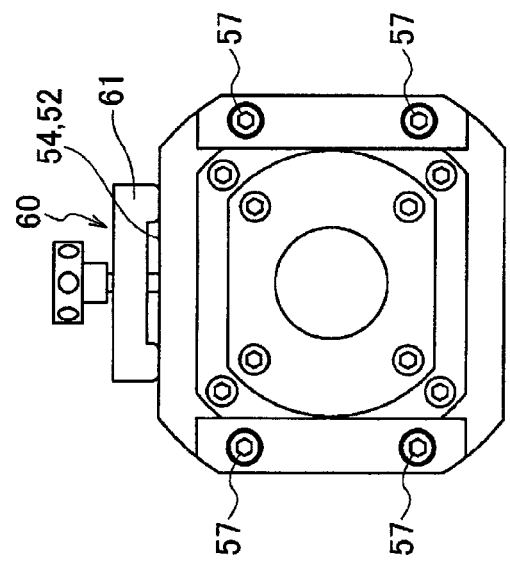

And, as shown in FIGS. 7A and 7B, the paralleling plate 61 of the paralleling mechanism 60 is moved so as to straddle a positioning surface 54 constituted of a plane formed in the removable bracket 53 and the reference surface 52 of the fixing bracket 51. In a state where butting surfaces D and D' constituted of the cylindrical surfaces of the removable bracket 53 and fixing bracket 51 are butted against each other, using a tool 62, the paralleling plate 61 is pressed against the positioning surface 54 of the removable bracket 53 and the reference surface 52 of the fixing bracket 51. After the positioning surface 54 of the removable bracket 53 of the grinding spindle 1A~1C is adjusted to be parallel to the reference surface 52 of the fixing bracket 51, as shown in FIGS. 8A and 8B, the four bolts 57 are fastened. This completes the phase adjustment of the fixing side quill 11.

Also, the fixing side quill 11 is supported by the removable bracket 53 such that it can be fine-adjusted vertically through an elongated hole 12a formed in the flange 12. With the four bolts 58 slightly loosened, the pin of a height adjusting mechanism 65 fixed to the removable bracket 53 is fastened or loosened toward the lower side plane of the flange 12, thereby enabling adjustment of the height of the fixing side quill 11.

Thus, as shown in FIGS. 8A and 8B, such one of the leading units 20A~20C as has the angle of the whetstone 40 matched to the lead angle of the screw groove of a work to be worked is selected and is mounted onto the fixing side unit 10, whereby the selected one of the grinding spindles 1A~1C can be mounted onto the spindle housing 50 without any troublesome adjusting operation.

As described above, according to the grinding spindles 1A~1C, the quill 2 having the whetstone 40 in its leading end and fixable to the spindle housing 50 (see FIGS. 6A and 6B) is divided to a fixing side quill 11 to be fixed to the spindle housing 50 and one of the leading end side quills 21A~21C having the whetstone 40, and the two divided parts are then removably connected to each other. Thus, by previously preparing multiple leading end side units 20A~20C with their respective whetstones 40 having inclination angles different from each other, the leading end side units 20A~20C can be replaced according to the lead angles of the screw grooves of works. That is, in the case that the position relationship of the connecting portions between the fixing side quill 11 and leading end side units 20A~20C are previously determined in the design producing stage, simply by previously positioning the fixing side unit 10 in the early stage for fixing the fixing side unit 10 to the spindle housing 50, the positioning operation when replacing the leading end side units 20A~20C can be reduced and thus, without troublesome adjustments, the inclination angle of the whetstone 40 corresponding to the lead angle of the screw groove to be worked can be realized.

Also, the connecting portions between the fixing side quill 11 and leading end side units 20A~20C have the flat surfaces C, C' perpendicular to the axis T of the quill 2 and are combined with each other, thereby enabling accurate inclination of the whetstone 40. And, since the connecting portion of the quill 2 has no angle adjusting mechanism, although the quill 2 is divided to two, the rigidity thereof can be enhanced sufficiently.

Also, the connecting end portions 17b, 27a of the first drive shaft 17 of the fixing side unit 10 and the second drive shaft 27 of the leading end side units 20A~20C have a polygonal section shape capable of sliding in the axial direction and rotating integrally with respect to the rotary joint 16. Thus, they can transmit the rotation drive force and can release tension caused by rotation and applied to the first and second drive shafts 17, 27, thereby preventing vibrations caused by the rotation of the first and second drive shafts 17, 27.

Figure 10:
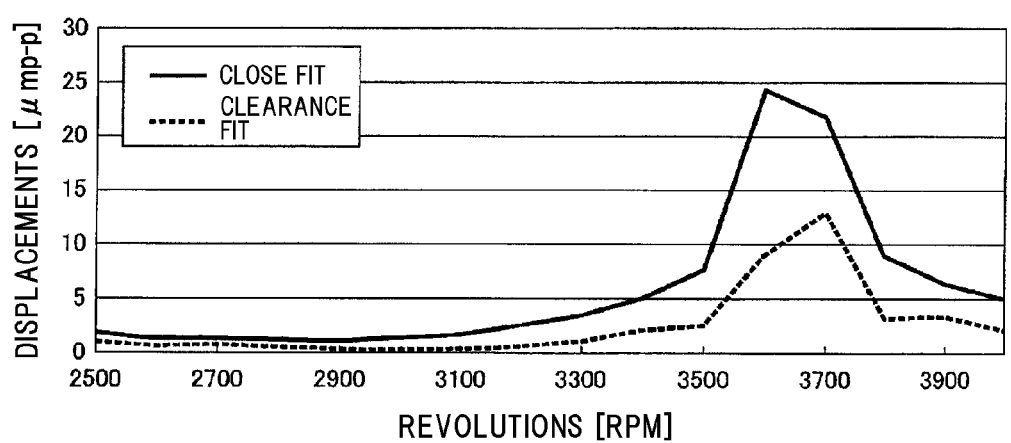
FIG. 10 is a characteristics diagram of the displacements of a drive shaft with respect to revolutions in the grinding spindle of this embodiment when a drive shaft disposed in the fixed side quill and a drive shaft disposed in the leading end side quill are connected through a rotary joint by close fit and by clearance fit.
Figure 11:
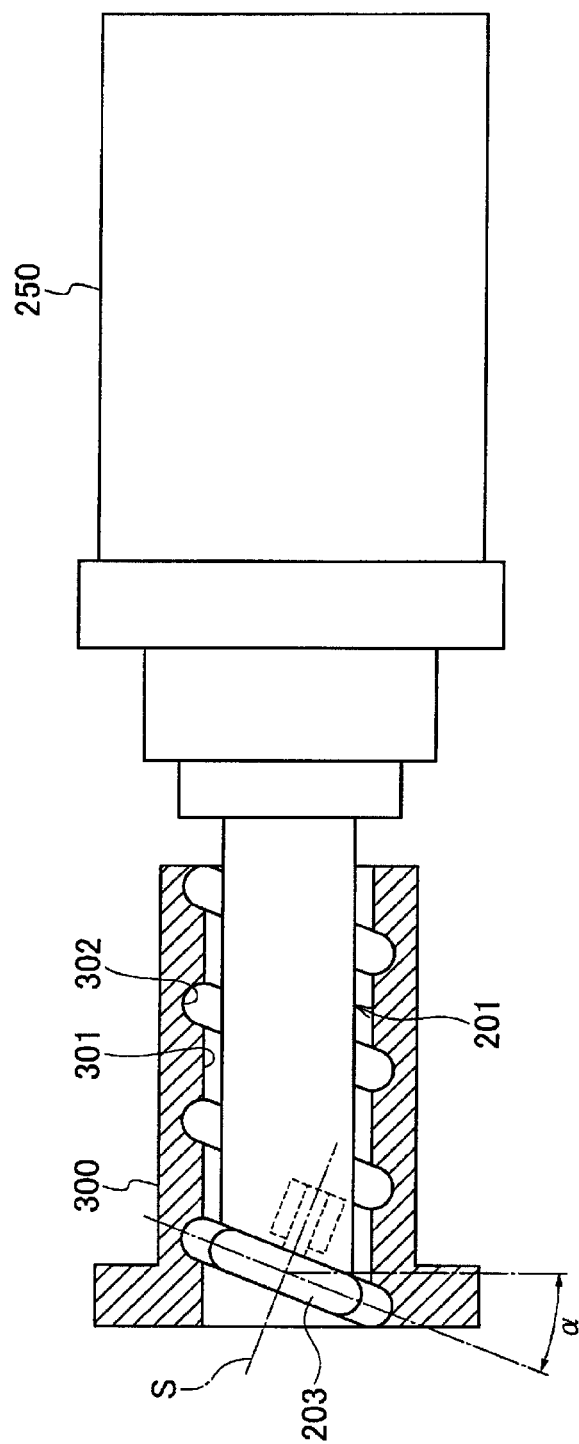
FIG. 11 is a side view of an example of a conventional grinding spindle.

FIG. 10 is a characteristics diagram of the displacements of the first drive shaft 17 provided within the fixing side quill 11 and second drive shaft 27 provided within the leading end side quills 21A~21C corresponding to the revolutions of the first and second drive shafts 17, 27, when the first and second drive shafts 17, 27 are connected to each other through the rotary joint 16 by close fit and by clearance fit. As shown in this diagram, when compared with the connection of the drive shafts 17, 27 through the rotary joint 16 by close fit, the connection through the rotary joint 16 by clearance fit can restrict the displacements (vibrations) effectively.

Also, since, in the connecting portions between the fixing side quill 11 and leading end side quills 21A~21C, there are formed the spigot fitting portion 30 for positioning and pin 31 and elongated 34 serving as phase adjusting means, the leading end side quills 21A~21C can be connected to the fixing side quill 11 while positioning them easily. This can prevent the cutting direction of the whetstone 40 from shifting from a proper direction and thus can prevent occurrence of an error in the lead angle of the screw groove.

Here, let us assume that the previously prepared leading end side units 20A 20C with their whetstones 40 having different inclination angles cannot cope with the lead angle of the screw groove. In this case, while one of the leading end side units 20A~20C with its whetstone 40 having such angle as is approximate to the screw groove lead angle is connected to the fixing side unit 10, such angle of the whetstone 40 can also be adjusted using the angle adjusting mechanism of the spindle housing 50.

Also, by providing a paralleling mechanism for phase adjusting the fixing side quill 11 with respect to the spindle housing 50, the phase adjustment of the fixing side quill 11 can be facilitated.

Similarly, by proving the height adjusting mechanism 65 for adjusting the height of the fixing side quill 11 with respect to the spindle housing 50, the height adjustment of the fixing side quill 11 can be facilitated.

Here, the invention is not limited to the above embodiment but can be changed or improved properly. Also, the materials, shapes, dimensions, number, arrangement positions and the like of the respective composing elements of the embodiment are not limitative but arbitrary so long as they can attain the invention.

For example, the first and second drive shafts are not limited to the structure for connecting them to each other through the rotary joint of the embodiment so long as they can be removably connected.

Although description has been given heretofore specifically and with reference to the specific embodiment, it is obvious to those skilled in the art that various changes and modifications are possible without departing from the scope and spirit of the invention. This application is based on Japanese Patent Application No. 2012-240926 filed on Oct. 31, 2012 and thus the contents thereof are incorporated herein for reference.

DESCRIPTION OF REFERENCE NUMERALS AND SIGNS

1A~1C: grinding spindle
2: quill
10: fixing side unit
11: fixing side quill
16: rotary joint
17: first drive shaft
20A~20C: leading end side unit 21A~21C: leading end side quill
27: second drive shaft
30: spigot fitting member (spigot fitting portion)
31: pin (phase adjusting means)
34: elongated hole (phase adjusting means)
40: whetstone
50: spindle housing
S: rotation axis of whetstone
T: axis of quill
C, C': flat surface

The invention claimed is:

1. A grinding spindle for use in a screw grinder, comprising:
 a quill to be mounted on a spindle housing;
 a whetstone provided on a leading end of the quill; and
 a flexible drive shaft, rotatably supported through a bearing, provided within the quill for driving the whetstone, and configured to impart torque between the whetstone and the spindle housing, with a rotation axis of the whetstone being inclined relative to an axis of the quill according to a lead angle of a screw groove to be formed in an inner peripheral surface of a work to be mounted on a spindle disposed opposed to the spindle housing, wherein:
 the quill includes a fixing side quill to be fixed to the spindle housing and a leading end side quill having the whetstone mounted thereon and removably connectable to the fixing side quill;
 in connecting portions between the fixing side quill and the leading end side quill, an end face of the fixing side quill perpendicular to the axis of the quill and an end face of the leading end side quill are combined with each other;
 the drive shaft includes a first drive shaft, having flexibility, provided within the fixing side quill such that there is a misalignment of a first end of the first drive shaft and a second end of the first drive shaft along the axis of the quill, wherein the misalignment is solely accommodated by the flexibility of the first drive shaft and a second drive shaft, having flexibility, provided within the leading end side quill such that there is a misalignment of a first end of the second drive shaft and a second end of the second drive shaft along the axis of the quill wherein the misalignment is solely accommodated by the flexibility of the second drive shaft and rotatable integrally with the whetstone;
 the first and second drive shafts are removably connected to each other by a rotary joint; and
 the first and second drive, shafts are in direct contact with the rotary joint.

2. The grinding spindle according to claim 1, wherein:
 a connecting end portion of the first drive shaft and a connecting end portion of the second drive shaft respectively to be connected to the rotary joint respectively have a polygonal section shape capable of sliding in an axial direction relative to the rotary joint and also of rotating integrally with the rotary joint.

3. The grinding spindle according to claim 1, wherein the connecting portions include a spigot fitting portion for centering the leading end side quill with respect to the fixing side quill and phase adjusting means for phase adjusting the leading end side quill with respect to the fixing side quill.

4. The grinding spindle according to claim 1, further comprising a phase adjusting mechanism for phase adjusting the fixing side quill with respect to the spindle housing.

5. The grinding spindle according to claim 4, further comprising:
 a fixing bracket to be fixed to the spindle housing so as to be parallel thereto; and
 a removable bracket removably mounted on the fixing bracket for supporting the fixing side quill, wherein:
 the fixing side quill is fixed to the spindle housing through the removable bracket and the fixing bracket by fastening the removable bracket to the fixing bracket; and
 the phase adjusting mechanism includes a paralleling plate mounted on the fixing bracket and contactable with a side surface of the fixing bracket and a side surface of the removable bracket such that the side surface of the fixing bracket and the side surface of the removable bracket are parallel to each other.

6. The grinding spindle according to claim 5, further comprising a height adjusting mechanism for adjusting a position of the fixing side quill in a direction perpendicular to the axis of the quill.

7. The grinding spindle according to claim 6, wherein:
 the removable bracket is structured to support the fixing side quill such that the fixing side quill can be adjusted finely in the direction perpendicular to the axis of the quill; and
 the height adjusting mechanism is mounted on the removable bracket and moves the fixing side quill in the direction perpendicular to the axis of the quill to thereby adjust the position of the fixing side quill.

8. The grinding spindle according to claim 1, wherein the first drive shaft and the second drive shaft are connected at a portion far from a center of the quill.

* * * * *